United States Patent [19]

Topalian et al.

[11]  4,297,379
[45]  Oct. 27, 1981

[54] FROZEN AERATED READY-TO-EAT GELATIN COMPOSITION

[75] Inventors: Harry H. Topalian, Dover; Clement R. Wyss, Lewes; Ralph E. Kenyon; Anthony F. Dec, both of Dover, all of Del.

[73] Assignee: General Foods Corporation, White Plains, N.Y.

[21] Appl. No.: 134,609

[22] Filed: Mar. 27, 1980

[51] Int. Cl.³ .............................................. A23L 1/04
[52] U.S. Cl. ................................... 426/565; 426/576
[58] Field of Search ....................... 426/565, 576, 654

[56] References Cited

U.S. PATENT DOCUMENTS

| | | | |
|---|---|---|---|
| 2,130,654 | 9/1938 | Sadler | 426/565 |
| 2,395,060 | 2/1946 | Musher | 426/565 |
| 2,431,704 | 12/1947 | Musher | 426/565 |
| 2,588,308 | 3/1952 | Tressler | 426/565 |
| 2,694,643 | 11/1954 | Robinson et al. | 426/576 |
| 3,702,768 | 11/1972 | Finucane | 426/565 |
| 3,792,182 | 2/1974 | Carpigiani | 426/576 |
| 4,189,502 | 2/1980 | Rubenstein | 426/565 |

FOREIGN PATENT DOCUMENTS 1542698  3/1979  United Kingdom ............... 426/565

*Primary Examiner*—Jeanette M. Hunter
*Attorney, Agent, or Firm*—Mitchell D. Bittman

[57] ABSTRACT

A frozen aerated gelatin mix is prepared by dissolving a gelatin mix containing 0.6% to less than 5% gelatin, 5% to 50% solids and acid in water, cooling the dissolved mix while agitating and aerating the mix, shaping, then freezing the mix to a core temperature less than 10° F. (−10° C.). This frozen aerated composition has a pH of 2.5 to 7 and is ready-to-eat at freezer temperatures, while providing a smooth and creamy texture, but without excessive gummy or icy characteristics.

20 Claims, No Drawings

FROZEN AERATED READY-TO-EAT GELATIN COMPOSITION

BACKGROUND

This invention relates to high quality frozen desserts and more particularly to a frozen aerated gelatin composition which is storage stable, smooth and creamy without gummy or icy characteristics. The resultant frozen aerated composition is able to maintain its shape on a stick while remaining soft, creamy and read-to-eat at freezer temperatures. As well, the frozen composition holds its shape and does not weep (release water) during thawing and thus avoids dripping during consumption. Further, after thawing, the composition yields a high quality soft gel with no syneresis as is typical of frozen thawed systems.

A ready-to-eat frozen aerated product, which is portable and can support itself on a stick while providing excellent eating qualities has long been desired. While ice cream has been available, ice cream drips upon thawing, and in addition the consumer has expressed a desire for a frozen dessert with less fat and lighter texture. Many attempts have been made prior to this invention to produce a ready-to-eat frozen aerated dessert, but these products have not proven to be acceptable to the consumer in terms of taste and mouthfeel. These prior art products for the most part are excessively gummy and do not yield the soft and creamy characteristics desirable when eaten out of the freezer (about 0° to 20° F., −20° to −5° C.).

SUMMARY

In accordance with the present invention a high quality frozen aerated ready-to-eat gelatin composition is produced by dissolving a gelatin mix in water at a temperature sufficient to dissolve the mix; cooling the dissolved mix to a temperature of 10° to 32° F. (−12° to 0° C.) to at least partially freeze the mix while simultaneously aerating and agitating the mix, with the aeration creating an overrun of 3 to 200% by volume; then shaping the mix; followed by freezing the shaped mix to a core temperature less than 10° F. (−10° C.), the frozen shaped mix having ice crystals with a size within the range of 20 to 200 microns. The gelatin mix comprises from 0.6 to less than 5% of gelatin by weight of the composition, from 5 to 50% of soluble solids by weight of the composition, and an edible acid in an amount effective to impart to the composition a pH within the range of 2.5 to 7. The specified level of gelatin in the mix when critically processed while controlling ice crystal size and aeration produces a frozen aerated dessert composition which is ready to eat at freezer temperatures (about 0° to 20° F., −20° to −5° C.), while providing a smooth and creamy texture, but without excessive gummy or icy characteristics. This frozen composition maintains its shape on a stick during thawing and minimizes or eliminates weeping or release of water and thus avoids dripping.

DETAILED DESCRIPTION OF THE INVENTION

In general the frozen aerated gelatin composition of the present invention comprises a gelatin mix including gelatin, soluble solids and an acid. The mix is dissolved in water, then cooled to 10° to 32° F. (−12° to 0° C.) while being aerated and agitated, and then shaped and subsequently frozen controlling overrun and ice crystal sizes to create a frozen matrix. This shaped frozen matrix is storage stable and maintains its shape, but possesses a smooth and creamy texture without excessive gummy or icy characteristics. By storage stable, it is meant that under a frozen food distribution system (at about 0° to 15° F., −20° to −10° C.) the frozen aerated composition is stable, i.e., without changing texturally and without substantial ice crystal growth for a period of at least six months, preferably one year.

The gelatin mix used to prepare the frozen aerated gelatin composition critically contains gelatin at a level within the range of 0.6 to less than 5%, preferably 0.8 to 2.5%, by weight of the frozen composition. This level of gelatin is critical in obtaining a stable composition with the creamy and smooth texture desired while avoiding excessive gummy, rubbery and icy characteristics which are common with different levels or other gums. The gelatin also enables the frozen aerated composition to maintain its shape on a stick when frozen and even during thawing, and minimizes or eliminates any weeping or release of water from the frozen composition during thawing. When other gums systems without gelatin (e.g. algin, carboxymethylcellulose, locust bean, guar, etc) were examined, it was observed that these gums generally produced frozen desserts which had one or more of the following drawbacks: lacked the desired smoothness or meltaway in the mouth; lacked the requisite stability; generally possessed excessive gummy or icy characteristics; during thawing the frozen desserts released substantial water; and the frozen dessert would not maintain its shape on a stick.

The gelatin must be of a type which is capable of gelatin and setting in order to provide a matrix to hold the frozen aerated composition together. Preferably the gelatin has a bloom strength within the range of 100 to 300 bloom. Both acid and base processed gelatins (i.e. from porkskins or hides) are suitable.

The gelatin mix also contains an acid for process and microbiological stability and taste in an amount effective to impart to the frozen composition a pH within the range of 2.5 to 7, preferably 3.8 to 6.5. Suitable acids include adipic acid, fumaric acid, malic acid, citric acid, tartaric acid, etc. A buffer may also be included to maintain a desired acidic pH during all phases of processing. Suitable buffers include sodium citrate, disodium phosphate, potassium phosphate, sodium tartrate, etc.

The gelatin mix further contains soluble solids at a level of 5 to 50%, preferably 15 to 30%, by weight of the frozen composition. The soluble solids are essential in rendering the frozen aerated composition ready-to-eat at freezer temperature (0° to 20° F., −20° to −5° C.), while imparting a creamy and smooth texture which is continuous and uniform. The solids level when combined with the gelatin and the critical processing parameters are important in controlling ice crystal size and overrun, which results in the extended stability and desired texture of the frozen aerated composition. The soluble solids can include dextrin, hydrolyzed cereal solids and preferably a sweetener such as sugar or nonnutritive sweeteners such as saccharin or aspartame. Appropriate sugars include sucrose, dextrose, glucose, fructose, high fructose corn syrup or combinations thereof. The soluble solids and the aeration also act to depress the freezing point and allow the frozen aerated composition to be ready-to-eat at freezer temperatures. The soluble solids can further contain other freezing point depressants such as glycerol, propylene glycol, malto dextrin, salts etc. which will contribute to smaller ice crystal size and impart to the frozen aerated composition a smoother, softer texture at lower temperatures.

The gelatin mix preferably additionally contains a stabilizer which in combination with the gelatin helps bind the water in the frozen aerated matrix and aids in retarding the growth of ice crystals during storage at freezer temperatures, thus extending the shelf life of the frozen aearated composition. The stabilizer is preferably employed at levels up to 0.5% by weight of the composition. Appropriate stabilizers include algin, carrageenan, xanthan, locust bean gum, low methoxyl pectin, guar, hydroxypropylmethylcellulose, carboxymethylcellulose, etc and blends thereof. While starch is a common ingredient in frozen desserts, the frozen aerated composition preferably does not contain starch, as under the critical processing parameters of this invention the starch granules are sheared and impart a grainy and/or gummy texture to the frozen aerated composition.

In an alternate embodiment of this invention fat can be incorporated, preferably with an emulsifier, into the frozen aerated composition, although the fat and emulsifier can readily be excluded from the composition while still obtaining a frozen aerated composition which is smooth and creamy. Fat may be desired to impart an even creamier and smoother texture similar to ice cream and is preferably employed at levels of 1 to 15%, by weight of the composition. Appropriate fats include butter fat, or vegetable fats such as palm kernel oil and coconut oil. Preferably the fat has a Wiley melting point in the range of 90° to 115° F. (30° to 45° C.) with an appropriate solids fat index to impart to the frozen aerated composition a desireable mouthfeel and meltdown in the mouth. A wide variety of emulsifiers can be used to incorporate the fat into the composition, such as hydroxylated lecithin, mono-or di-glycerides of fatty acids, fatty esters of polyhydric alcohols, etc.

In an additional alternate embodiment milk (preferably milk solids), such as non-fat milk solids, yogurt, or milk derivatives (e.g. casein and whey solids) can be incorporated into the frozen aerated composition to impart a smooth and creamy texture and appearance similar to ice cream. The milk solids are preferably employed at levels of 4 to 15%, by weight of the composition. Other acid stable proteins may be desirable as bodying or texturizing agents, such as egg white, lactalbumens etc., although the milk solids and other protein may be excluded from the composition while still obtaining a frozen aerated composition with smooth and creamy characteristics.

Other common ingredients which can be included in the gelatin mix include flavors, colors, fruits, nuts and vegetables, and can be incorporated at levels effective to impart a desired taste and apperance. As well, juice (vegetable or fruit) can be used to dissolve the gelatin mix with a corresponding reduction in the gelatin mix of sugar, buffer, acid, color and flavor which already is present in the juice. The frozen aerated composition can also be glazed or coated with water, chocolate, fat, sugar, food pieces, etc. to impart a desireable taste, texture and appearance to the composition.

Critical to obtaining a frozen aerate composition wht the desired taste, texture, appearance and stability is the following processing conditions. The first step is dissolving the gelatin mix in water (including milk or juice) at a temperature sufficient to dissolve the gelatin mix, preferably 160° to 180° F. (70° to 82° C.). If fat is to be included in the composition, an additional homogenization step is desirable to incorporate the fat and preferably an emulsifier, into the dissolved mix. An additional pasteurization step may also be desireable if there are any microbiological concerns. The dissolved mix is then preferably cooled to a temperature within the range of 60° to 90° F. (15° to 32° C.) to retard the loss of any volatile flavors.

The dissolved mix is then cooled to a temperature within the range of 10° to 32° F. ($-12°$ to 0° C.), preferably 15° to 29° F. ($-10°$ to $-1°$ C.), to at least partially freeze the mix while simultaneously aerating and agitating the dissolved mix. This cooling, aerating and agitating step is carried out under controlled conditions, preferably in a swept surface heat exchanger, to create an overrun (incorporation of air) of 3 to 200%, preferably 3–50%, by volume of the composition. Generally, the higher the level of gelatin the greater the level of the overrun which can be incorporated with the resultant frozen composition still retaining its desirable characteristics (stability, smooth, maintain shape on stick, etc.). The aerated mix is then shaped, for example, by extrusion, sheeting and cutting, mold filling or cup filling. During or after the shaping step, if desired, a stick can be inserted into the shaped mix. Following shaping (and stick insertion, if desired), the shaped mix is then frozen to a core temperature (temperature of the core of the shaped mix) of less than 10° F. ($-10°$ C.), packaged and then stored for future consumption. The cooling, agitating, aerating and final freezing is carried out under controlled conditions to create a frozen aerated composition having ice crystals with a size within the range of 20 to 200 microns, preferably 75 to 150 microns. The initial cooling at least partially freezes the dissolved mix (i.e. at least a significant or substantial portion of mix freezing) and initiates the formation of ice crystals, with the final freezing completing the freezing and formation of ice crystals. The ice crystal size, aeration and gelatin levels are critical in obtaining a frozen aerated composition with a smooth and creamy texture, while being able to maintain its shape on a stick and being ready-to-eat at freezer temperatures.

The frozen aerated composition prepared as detailed above provides the consumer with a new dessert which can be eaten as a stick novelty or cup dessert and is ready-to-eat out of the freezer, while providing smooth and creamy characteristics. Uniquely, this composition maintains its shape and minimizes or eliminates the release of water during thawing, thus enabling the consumer to consume the frozen dessert without dripping or without the dessert falling off the stick. Further, after thawing the composition yields a soft gel without the syneresis typical of frozen thawed systems and thus can provide a soft refrigerated gel dessert.

EXAMPLE I

A frozen aerated composition was prepared containing the following ingredients in parts by weight:

|  | Parts/weight |
| --- | --- |
| Water | 76.3 |
| High Fructose Corn Syrup (80% solids) | 7.7 |
| Sucrose | 13.0 |
| Gelatin (250 bloom) | 1.9 |
| Adipic Acid | .4 |
| Sodium Citrate | .1 |
| Fumaric Acid | .1 |
| Blend of Locust Bean, Xanthan | |

-continued

|  | Parts/weight |
|---|---|
| and Guar Gum | .3 |
| Flavor | .1 |
| Color | .1 |

The dry ingredients were blended, then added and mixed with water heated to 160° F. (70° C.). The high fructose corn syrup was then mixed in and the dissolved mix was cooled to 90° F. (32° C.) in a heat exchanger. The dissolved mix was then cooled to about 24° F. (−4° C.), while simultaneously being aerated and agitated in an swept surface heat exchanger. Air was incorporated to create an overrun of about 40% by volume. The aerated mix was substantially frozen at this point and was then extruded into slices, cut, and sticks were inserted, followed by freezing to a core temperature of about 0° F. (−18° C.). The resultant frozen aerated composition had an ice crystal size of about 100 microns.

The frozen aerated composition possessed a novel creamy and smooth texture, without gummy or icy characteristics upon being eaten at freezer temperatures (about 0° to 20° F., −20° to 5° C.). During thawing the composition maintained its shape on the stick and did not weep or drip. After thawing a soft tasty gel was produced. This composition possessed extended storage stability (over one year at 0° F., −18° C.).

EXAMPLE II

A frozen aerated composition with milk was prepared containing the following ingredients in parts by weight:

|  | Parts/Weight |
|---|---|
| Whole Milk (12% solids) | 41.1 |
| Water | 37.6 |
| Sucrose | 11.3 |
| High Fructose Corn Syrup (80% solids) | 7.1 |
| Gelatin (250 Bloom) | 1.1 |
| Trisodium Citrate | .8 |
| Adipic Acid | .3 |
| Blend of Xanthan, Locust Bean and Guar gum | .3 |
| Emulsifier (mono and diglyceride and polysorbate 80) | .1 |
| Flavor | .2 |
| Color | .1 |

The water and milk were heated to a temperature of 170° F. (75° C.), then a blend of sugar and gums was mixed in, followed by mixing in the remaining ingredients. The dissolved mix was cooled to 90° F. (32° C.) in a heat exchanger and then cooled to about 26° F. (−3° C.) while simultaneously being aerated and agitated in a scraped surface heat exchanger. The mix was substantially frozen during cooling and the aeration created an overrun of about 5% by volume. The cooled mix was then extruded, sliced, and sticks were inserted followed by freezing to a core temperature of about 0° F. (−18° C.). The resultant frozen aerated composition had an ice crystal size of approximately 75 microns.

The frozen aerated composition possessed a very smooth and creamy texture without gummy or ice characteristics upon being eaten at freezer temperatures. The composition had an ice cream like texture and during thawing the composition maintained its shape on the stick and did not weep or drip.

EXAMPLE III

A frozen aerated composition with fat was prepared containing the following ingredients in parts by weight:

|  | Parts/Weight |
|---|---|
| Water | 73.0 |
| Sucrose | 11.7 |
| High Fructose Corn Syrup (80% Solids) | 7.6 |
| Coconut oil (Wiley melting point of 92° F., 33° C.) | 5.4 |
| Gelatin (250 bloom) | 1.0 |
| Adipic Acid | .4 |
| Sodium Citrate | .1 |
| Fumaric Acid | .1 |
| Blend of Xanthan, Locust Bean and Guar Gum | .1 |
| Diglycerides | .3 |
| Hydroxypropylmethylcellulose | .1 |
| Flavor | .1 |
| Color | .1 |

The coconut oil and diglycerides were blended at 160° F. (70° C.), then added to water at 160° F. (70° C.). The remaining ingredients were then added followed by homogenizing the entire mix. The mix was then cooled to 90° F. (32° C.) in a heat exchanger, followed by cooling to about 26° F. (−3° C.) while simultaneously being aerated and agitated in a swept surface heat exchanger. The cooled mix was substantially frozen with air incorporated at a level of about 5% by volume. The aerated mix was then extruded into slices, cut and sticks inserted, followed by freezing to a core temperature of about 0° F. (−18° C.). The resultant frozen aerated composition had an ice crystal size of about 75 microns.

The frozen aerated composition was extremely smooth and creamy with a texture similar to ice cream upon being eaten out of the freezer. The composition did not have gummy or icy characteristics. During thawing the composition maintained its shape and did not drip or release water.

What is claimed is:

1. Process for preparing a frozen aerated starch-free gelatin composition with smooth, creamy, continuous and uniform characteristics and which is ready-to-eat at freezer temperatures comprising:

dissolving a gelatin mix in water at a temperature sufficient to dissolve the mix, said mix comprising an amount of gelatin effective to stabilize the composition and provide a smooth and creamy texture without gummy or icy characteristics, said amount being within the range of from 0.6% to less than 5% of gelatin by weight of the composition, from 5% to 50% soluble solids by weight of the composition, and acid in an amount effective to impart a pH within the range of 2.5 to 7 to the composition.

cooling the dissolved mix to a temperature of from 10° to 32° F. to at least partially freeze the mix while simultaneously aerating and agitating the dissolved mix, the aeration creating an overrun of from 3 to 200% by volume of the composition;

shaping said aerated mix; and freezing said shaped mix to a temperature less than 10° F., said frozen mix having ice crystals of a size within the range of 20 to 200 microns.

2. Process of claim 1 wherein said soluble solids comprise a sweetener and the gelatin mix further comprises a stabilizer.

3. Process of claim 1 wherein the aeration creates an overrun of 3 to 50% by volume of the composition.

4. Process of claim 2 wherein the gelatin mix comprises from 0.8% to 2.5% of gelatin by weight of the composition.

5. Process of claim 4 wherein the gelatin has a bloom strength within the range of 100 to 300.

6. Process of claim 2 wherein the frozen mix has ice crystals of a size within the range of 75 to 150 microns.

7. Process of claim 4 wherein the amount of stabilizer is less than 0.5% by weight of the composition.

8. Process of claim 2 wherein the stabilizer is chosen from the group consisting of xanthan gum, low methoxyl pectin, locust bean gum, guar gum, hydroxypropylmethylcellulose, algin and carrageenan.

9. Process of claim 2 wherein the gelatin mix comprises acid in an amount effective to impart a pH within the range of 3.8 to 6.5.

10. Process of claim 2 wherein the sweetener is a sugar chosen from the group consisting of sucrose, corn syrup solids, dextrose, fructose and glucose.

11. Process of claim 2 wherein the soluble solids further comprise freezing point depressants chosen from the group consisting of glycerol, propylene glycol, dextrin, hydrolyzed cereal solids and salts.

12. Process of claim 9 wherein the acid is chosen from the group consisting of adipic acid, fumaric acid, malic acid, citric acid and tartaric acid.

13. Process of claim 2 wherein the composition further comprises a fat and prior to freezing the fat is incorporated into the dissolved mix by homogenization.

14. Process of claim 13 wherein the composition further comprises an emulsifier.

15. Process of claim 2 wherein the soluble solids further comprise milk solids.

16. Process of claim 1 wherein after the mixture is shaped a stick is inserted to enable the frozen compostion to be hand held while being eaten.

17. Process of claim 1 wherein the amount of soluble solids is within the range of 15 to 30% by weight of the composition.

18. Process of claim 1 wherein the dissolved mix is cooled, aerated and agitated in a swept surface heat exchanger.

19. Process of claim 9 further comprising a buffer.

20. Process of claim 19 wherein the buffer is chosen from the group consisting of sodium citrate and disodium phosphate.

* * * * *